US008429998B2

(12) United States Patent
Feng

(10) Patent No.: US 8,429,998 B2
(45) Date of Patent: Apr. 30, 2013

(54) PARALLEL MECHANISM AND MOVEABLE LINKAGE THEREOF

(75) Inventor: Yong Feng, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 620 days.

(21) Appl. No.: 12/639,205

(22) Filed: Dec. 16, 2009

(65) Prior Publication Data
US 2011/0072929 A1 Mar. 31, 2011

(30) Foreign Application Priority Data

Sep. 29, 2009 (CN) .......................... 2009 1 0307996

(51) Int. Cl.
B25J 17/00 (2006.01)
B25J 17/02 (2006.01)
B25J 18/00 (2006.01)

(52) U.S. Cl.
USPC ............................................ 74/490.1; 901/14

(58) Field of Classification Search ............... 74/490.01; 901/14; 384/295, 296, 276, 396
See application file for complete search history.

(56) References Cited

U.S. PATENT DOCUMENTS

| 3,825,357 | A | * | 7/1974 | Hilton | 403/161 |
| 4,976,582 | A | * | 12/1990 | Clavel | 414/729 |
| 6,238,127 | B1 | * | 5/2001 | Jhumra et al. | 403/282 |
| 6,543,987 | B2 | * | 4/2003 | Ehrat | 414/735 |
| 2008/0141813 | A1 | * | 6/2008 | Ehrat | 74/490.01 |
| 2009/0301253 | A1 | * | 12/2009 | Nishida et al. | 74/490.01 |
| 2010/0005919 | A1 | * | 1/2010 | Breu | 74/490.05 |
| 2010/0139436 | A1 | * | 6/2010 | Kawashima et al. | 74/490.01 |
| 2011/0100145 | A1 | * | 5/2011 | Feng | 74/490.01 |

FOREIGN PATENT DOCUMENTS

CN 1857875 A 11/2006
WO WO2008/092540 * 8/2008

* cited by examiner

Primary Examiner — Justin Krause
(74) Attorney, Agent, or Firm — Altis Law Group, Inc.

(57) ABSTRACT

A moveable linkage for a parallel mechanism includes a swing arm, a four-link structure rotatably connected to the swing arm, and a plurality of pivotal shafts. The four-link structure includes a first connection shaft, a second connection shaft, a first link bracket and a second link bracket. Each of the first and second link brackets includes a first end portion and a second end portion. The first end portions of the first and second link brackets overlap and rotatably connect two ends of the first connection shaft by the pivotal shafts. The second end portions of the first and second link brackets overlap and rotatably connect two ends of the second connection shaft by the pivotal shafts.

16 Claims, 4 Drawing Sheets

PARALLEL MECHANISM AND MOVEABLE LINKAGE THEREOF

BACKGROUND

1. Technical Field

The present disclosure relates to parallel mechanisms and, particularly, to a parallel mechanism used in an industrial robot and a moveable linkage of the parallel mechanism.

2. Description of Related Art

Multiple freedom parallel mechanisms, especially four freedom parallel mechanisms, are commonly used in industrial robots to provide multi-directional movement.

Referring to FIG. 4, a commonly used four freedom parallel mechanism 100 includes a stationary platform 11, a dynamic platform 12, a rotatable linkage 13 and three moveable linkages 15 connecting the stationary platform 11 and the dynamic platform 12. The rotatable linkage 13 is capable of rotating independently. The moveable linkages 15 are movable along three axes X, Y, Z. Each moveable linkage 15 includes a swing arm 151 movably connected to the stationary platform 11 and a four-link structure 152 rotatably connected to the swing arm 151. The four-link structure 152 includes four link rods 1521 connected one by one via spherical joints 153. The opposite link rods 1521 are fixed to the swing arm 151 and the dynamic platform 12 respectively. During operation, a motor or other driving device swings the swing arm 151, driving the four-link structure 152 to fold, unfold, move, or rotate, thereby realizing the three-dimensional motion of the dynamic platform 12.

However, the spherical joints 153 have a relatively limited rotation angle, about 25° or less, such that the movable distance of the four-link structure 152 is limited, thus limiting the flexibility of the common parallel mechanism 100. In addition, the spherical joints 153 are difficult to manufacture and assemble, increasing costs of the common parallel mechanism 100.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views, and all the views are schematic.

DETAILED DESCRIPTION

Figure 1:
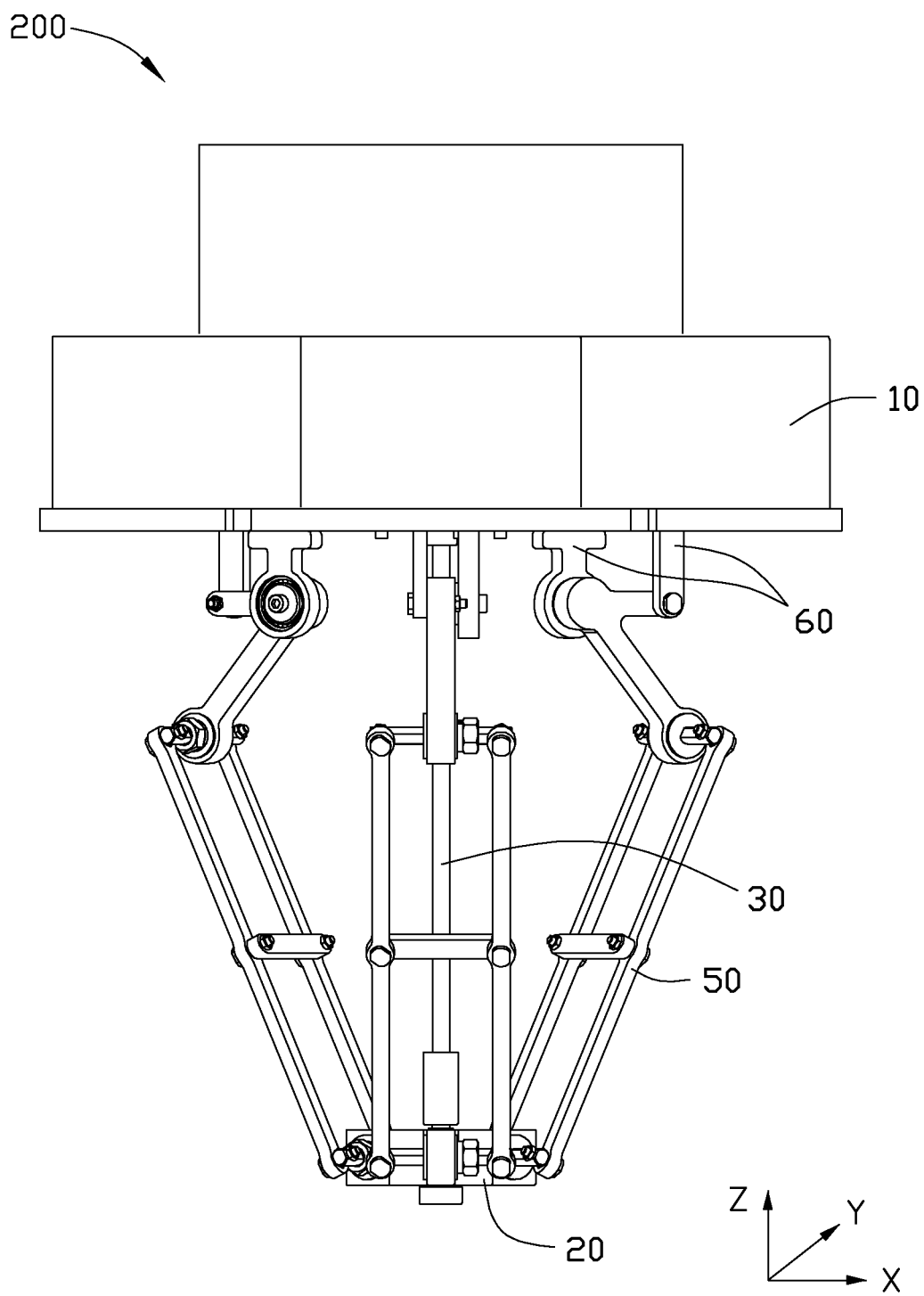
FIG. 1 is a plan view of an embodiment of a parallel mechanism including a moveable linkage.

Referring to FIG. 1, an embodiment of a parallel mechanism 200 is a four freedom parallel mechanism, and includes a stationary platform 10, a movable platform 20, a rotatable linkage 30, three movable linkages 50 connecting the stationary platform 10 and the movable platform 20, and four driving modules 60. The rotatable linkage 30 and the movable linkages 50 are movably connected to the stationary platform 10 by the driving modules 60.

Figure 2:
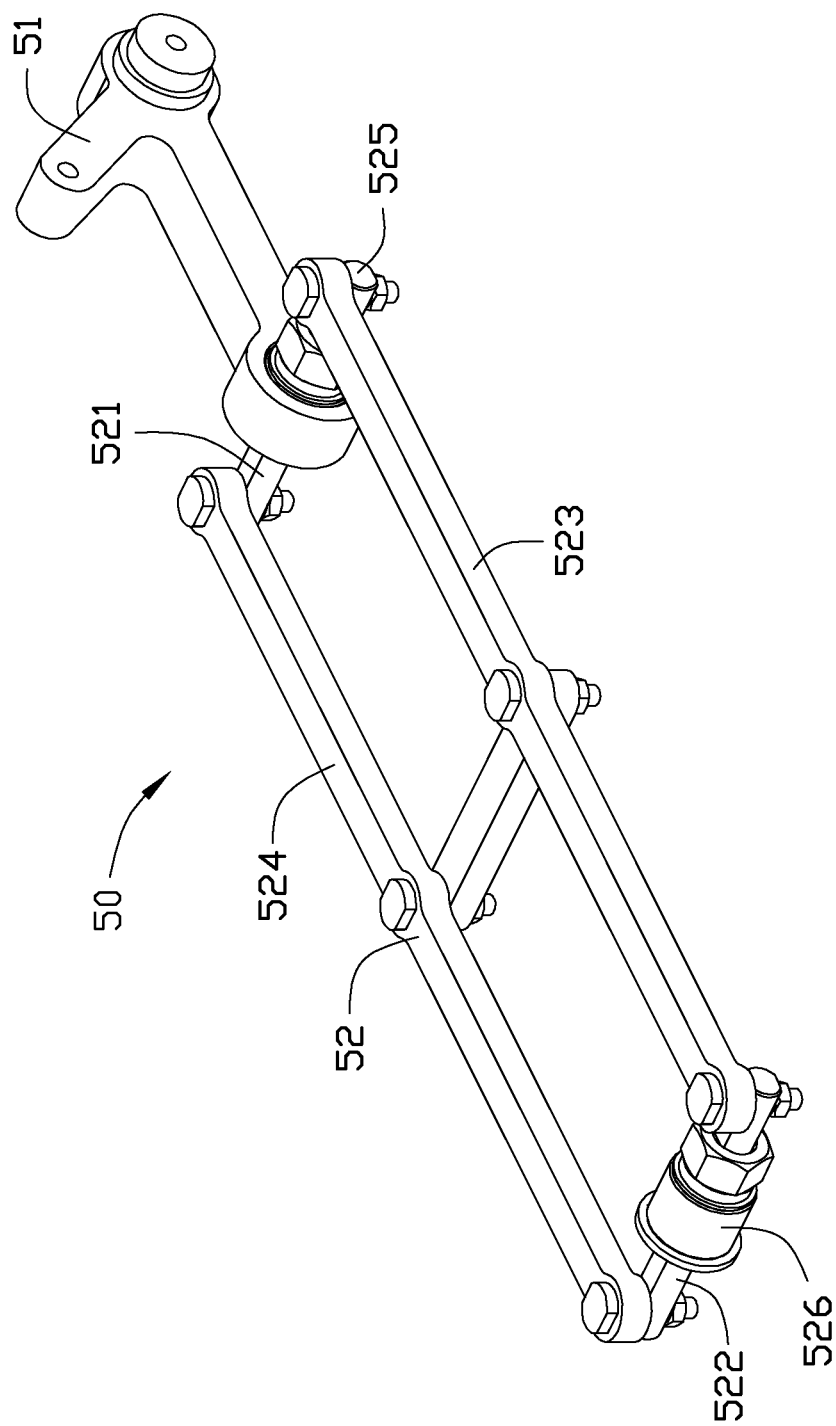
FIG. 2 is an assembled, isometric view of a moveable linkage applied in a parallel mechanism such as, for example, that in FIG. 1.
Figure 3:
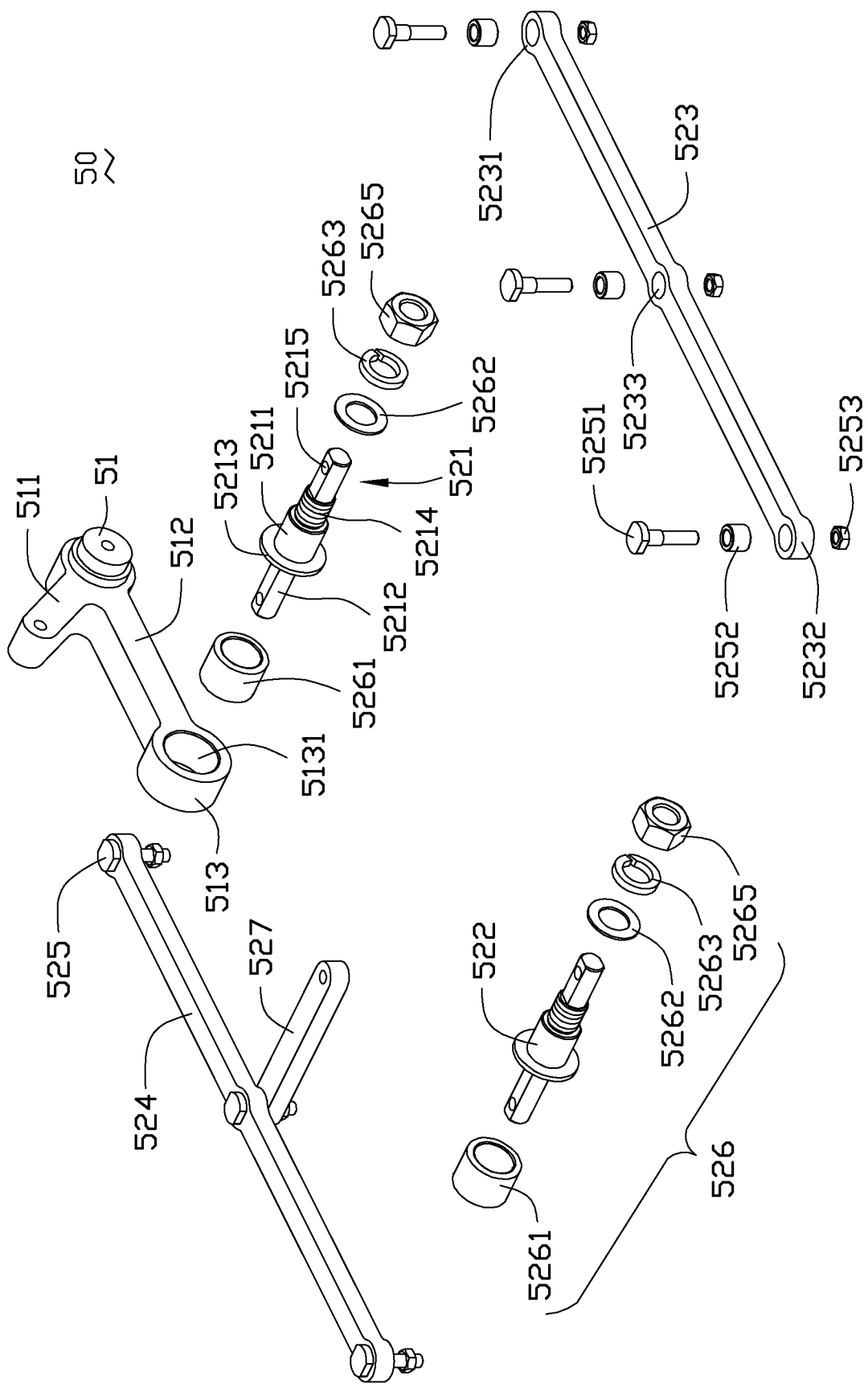
FIG. 3 is an exploded, isometric view of the moveable linkage in FIG. 2.
Figure 4:
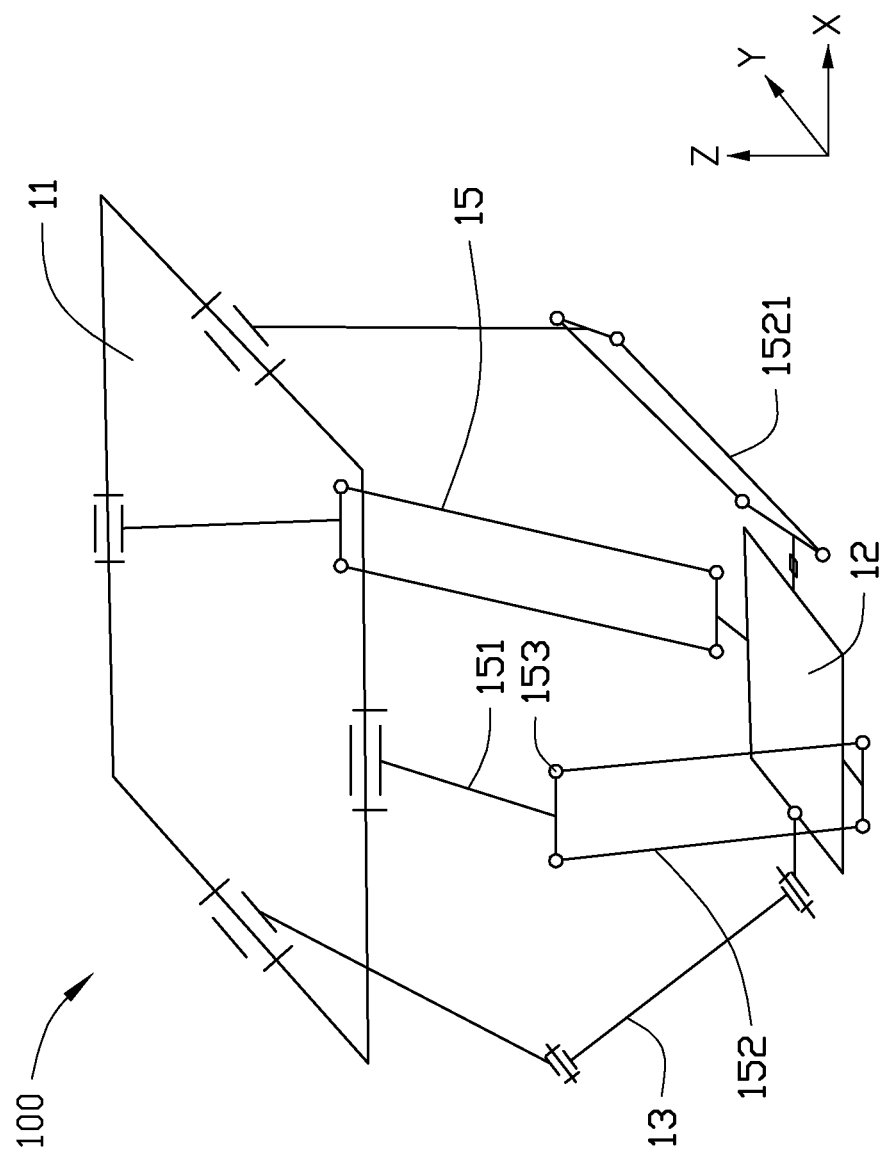
FIG. 4 is a simplified view of a common parallel mechanism.

Referring also to FIGS. 2 and 3, each moveable linkage 50 includes a swing arm 51 and a four-link structure 52. The four-link structure 52 includes a first connection shaft 521, a second connection shaft 522, a first link bracket 523, a second link bracket 524, a plurality of connection modules 525, and two pivotal modules 526. The first connection shaft 521 is rotatably connected to the swing arm 51, the second connection shaft 522 is rotatably connected to the movable platform 20. The first and second link brackets 523, 524 are rotatably connected to the first and second connection shafts 521, 522 by the connection modules 525 respectively.

The swing arm 51 includes a connection portion 511 and a swing portion 512. The swing portion 512 forms a substantially cylindrical rotating portion 513. The rotating portion 513 defines a circular hole 5131 in the center thereof.

The first connection shaft 521 includes a cylindrical shaft portion 5211 and two deformed shaft portions 5212 extending substantially perpendicularly from two ends of the circular shaft portion 5211. The first connection shaft 521 forms a flange 5213 and a threaded portion 5214 respectively adjacent to the two deformed shaft portions 5212. Each deformed shaft portion 5212 defines a shaft hole 5215 in an end thereof.

The second connection shaft 522 has a similar structure as the first connection shaft 521.

The first link bracket 523 is a substantially elongated rod, and includes a first end portion 5231 and a second end portion 5232 opposite to the first end portion 5231. Each of the first and second end portions 5231, 5232 and the middle portion of the first link bracket 523 defines a shaft hole 5233.

The second link bracket 524 has a similar structure as the first link bracket 523.

Each connection module 525 includes a pivotal shaft 5251, a sleeve 5252, and a fastening member 5253. The pivotal shaft 5251 forms a threaded portion (not shown) to engage with the fastening member 5253. The sleeve 5252 has an outer diameter less than the diameter of the shaft hole 5233, and can thus be received therein.

Each pivotal module 526 includes a sleeve 5261, a frictional piece 5262, a resisting member 5263 and a securing member 5265. The sleeve 5261 has an outer diameter less than the diameter of the circular hole 5131, and can thus be received therein.

During assembly, the connection portion 511 of the swing arm 51 is rotatably connected to the driving modules 60 positioned on the stationary platform 10. The swing portion 512 of the swing arm 51 is rotatably connected to the first connection shaft 521. The sleeve 5261 is sleeved on the circular shaft portion 5211. The first connection shaft 521 passes through the rotating portion 513, and the circular shaft portion 5211 together with the sleeve 5261 are received in the circular hole 5131. The flange 5213 abuts a side surface of the rotating portion 513, thus preventing the sleeve 5261 from disengaging from the circular hole 5131. The frictional piece 5262 and the resisting member 5263 are sleeved on the threaded portion 5214. The securing member 5265 engages the threaded portion 5214 to push the frictional piece 5262 and the resisting member 5263 to tightly contact each other, thus increasing the rotation stability of the first connection shaft 521 relative to the swing arm 51.

The sleeve 5252 is sleeved on the pivotal shaft 5251. The pivotal shaft 5251 passes through the shaft hole 5233 in the first end portion 5231 of the first link bracket 523, the shaft hole 5215 of the first connection shaft 521, and engages with the fastening member 5253. Accordingly, the first end portion 5231 of the first link bracket 523 overlaps and rotatably connects to an end portion of the first connection shaft 521 by the connection module 525. The first end portion of the second link bracket 524 overlaps and rotatably connects to the other end portion of the first connection shaft 521 by the same way.

Finally, the second connection shaft 522 is rotatably connected to the movable platform 20 in the same way as the first connection shaft 521 connects to the swing arm 51. The second end portions of the first and second link bracket 523, 524 respectively overlap and rotatably connect to two end portions of the second connection shaft 522 by the connection modules 525.

Furthermore, the four-link structure 52 can include a reinforced rod 527 with two ends rotatably connected to middle portions of the first and second link brackets 523, 524 by the connection modules 525. The reinforced rod 527 enhances a structural strength of the four-link structure 52, and ensures that the four-link structure 52 remains on the same plane during motion, thus increasing stability of the moveable linkage 50.

When using the parallel mechanism 200, a motor or other driving device rotates the rotatable linkage 30 or swings the swing arm 51, driving the four-link structure 52 to fold, unfold, move or rotate, thus enabling the movable linkage 50 to move along three axes X, Y, Z. The rotatable linkage 30 and three movable linkages 50 cooperatively drive the movable platform 20 to rotate, move, or lift. When the parallel mechanism 200 is applied in an industrial robot, a manipulator may be fixed on the movable platform 20 to realize various operations, such as grasping, cutting, or drilling a workpiece.

In the parallel mechanism 200, the first and second link brackets 523, 524 rotate relative to the first and second connection shafts 521, 522 without being restricted by the connection modules 525. Accordingly, the first and second link brackets 523, 524 have a relatively wide rotation angle, about 60° or more, thus the moving distance of the moveable linkage 50 is increased, as are the working space and the motion flexibility of the parallel mechanism 200. In addition, the four-link structure 52 is easily manufactured and assembled, thereby decreasing the costs of the parallel mechanism 200.

Moreover, the sleeves 5261 are sleeved on the first and second connection shafts 521, 522, and fit clearances between the first and second connection shafts 521, 522 and the swing arm 51 and the movable platform 20 are relatively small. Accordingly, the motion stability of the moveable linkage 50 is increased, and first and second connection shafts 521, 522 can be protected from abrasion. Similarly, the sleeves 5252 are sleeved on the pivotal shafts 5251, the fit clearances between the pivotal shafts 5251 and the first and second link brackets 523, 524 are relatively small, and motion stability of the moveable linkage 50 is further increased, with the pivotal shafts 5251 also protected from abrasion.

In alternative embodiments, the parallel mechanism 200 may have one, two, four, or five moveable linkages 50 to form other parallel mechanisms. The sleeves 5261, 5252, the frictional piece 5262, the resisting member 5263, and the reinforced rod 527 may all be omitted.

It is believed that the present embodiments and their advantages will be understood from the foregoing description, and it will be apparent that various changes may be made thereto without departing from the spirit and scope of the disclosure or sacrificing all of its material advantages.

What is claimed is:

1. A moveable linkage for a parallel mechanism, comprising:
    a swing arm comprising a connection portion and a swing portion, the connection portion and the swing portion cooperatively defining an acute angle, the swing portion forming a substantially cylindrical rotating portion;
    a four-link structure rotatably connected to the rotating portion of the swing arm, the four-link structure comprising a first connection shaft, a second connection shaft, a first link bracket, and a second link bracket; and
    a plurality of pivotal shafts, wherein the first and second link brackets and the first and second connection shafts overlap and rotatably connect the pivotal shafts.

2. The moveable linkage of claim 1, wherein the swing arm comprises a rotating portion defining a circular hole, and the first connection shaft comprises a circular shaft portion passing through the circular hole of the rotating portion.

3. The moveable linkage of claim 2, wherein the four-link structure further comprises a sleeve sleeved on the circular shaft portion of the first connection shaft, wherein the circular shaft portion together with the sleeve is received in the circular hole of the rotating portion.

4. The moveable linkage of claim 3, wherein the first connection shaft forms a flange adjacent to the circular shaft portion, and the flange abuts a side surface of the rotating portion to prevent the sleeve from disengaging from the circular hole.

5. The moveable linkage of claim 1, wherein each of the first and second link brackets comprises a first end portion and a second end portion, wherein the first end portions of the first and second link brackets overlap and rotatably connect two ends of the first connection shaft, the second end portions of the first and second link brackets overlap and rotatably connect two ends of the second connection shaft.

6. The moveable linkage of claim 1, wherein the first and second link brackets define a plurality of shaft holes; the four-link structure further comprises a plurality of sleeves sleeved on the plurality of pivotal shafts; the plurality of pivotal shafts together with the plurality of sleeves pass through the plurality of shaft holes.

7. The moveable linkage of claim 1, wherein the four-link structure further comprises a reinforced rod rotatably connected between the first and second link brackets.

8. The moveable linkage of claim 1, wherein the first connection shaft forms a threaded portion; the four-link structure further comprises a frictional piece, a resisting member sleeved on the threaded portion, and a securing member engaging the threaded portion, the securing member pushing the frictional piece and the resisting member to tightly contact each other.

9. A parallel mechanism for an industrial robot comprising:
    a stationary platform;
    a moveable platform; and
    a rotatable linkage and at least one movable linkage connecting the stationary platform and the moveable platform, the at least one movable linkage comprising:
    a swing arm comprising a connection portion and a swing portion, the connection portion and the swing portion cooperatively defining an acute angle, the swing portion forming a substantially cylindrical rotating portion;
    a four-link structure rotatably connected to the rotating portion of the swing arm, the four-link structure comprising a first connection shaft, a second connection shaft, a first link bracket, and a second link bracket; and
    a plurality of pivotal shafts, wherein the first and second link brackets and the first and second connection shafts overlap and rotatably connect the pivotal shafts.

10. The parallel mechanism of claim 9, wherein the swing arm is moveably connected to the stationary platform, and the first and second connection shafts are rotatably connected to the swing arm and the moveable platform respectively.

11. The parallel mechanism of claim 10, wherein the swing arm comprises a rotating portion defining a circular hole, and the first connection shaft comprises a circular shaft portion passing through the circular hole of the rotating portion.

12. The parallel mechanism of claim 11, wherein the four-link structure further comprises a sleeve sleeved on the circular shaft portion of the first connection shaft, and the circular shaft portion together with the sleeve are received in the circular hole of the rotating portion.

13. The parallel mechanism of claim 9, wherein each of the first and second link brackets comprises a first end portion and a second end portion, the first end portions of the first and second link brackets overlap and rotatably connect two ends of the first connection shaft, and the second end portions of the first and second link brackets overlap and rotatably connect two ends of the second connection shaft.

14. The parallel mechanism of claim 9, wherein the first and second link brackets define a plurality of shaft holes; the four-link structure further comprises a plurality of sleeves sleeved on the plurality of pivotal shafts; the plurality of pivotal shafts together with the plurality of sleeves pass through the plurality of shaft holes.

15. The parallel mechanism of claim 9, wherein the four-link structure further comprises a reinforced rod rotatably connected between the first and second link brackets.

16. A parallel mechanism for an industrial robot comprising:
   a stationary platform;
   a moveable platform; and
   a rotatable linkage and at least one movable linkage connecting the stationary platform and the moveable platform, the at least one movable linkage comprising:
   a swing arm;
   a four-link structure rotatably connected to the swing arm, the four-link structure comprising a first connection shaft, a second connection shaft, a first link bracket, and a second link bracket; and
   a plurality of pivotal shafts, wherein the first and second link brackets and the first and second connection shafts overlap and rotatably connect the pivotal shafts, and the second connection shaft is rotatably connected to the movable platform.

* * * * *